United States Patent [19]

Moskowitz et al.

[11] Patent Number: 5,684,367
[45] Date of Patent: Nov. 4, 1997

[54] COLOR CONTROL AND ARC STABILIZATION FOR HIGH-INTENSITY, DISCHARGE LAMPS

[75] Inventors: Warren P. Moskowitz, Ipswich; Joseph A. Olsen, Rockport, both of Mass.

[73] Assignee: OSRAM Sylvania Inc., Danvers, Mass.

[21] Appl. No.: 585,669

[22] Filed: Jan. 16, 1996

[51] Int. Cl.[6] .................................. H05B 37/02
[52] U.S. Cl. ...................... 315/246; 315/194; 315/291
[58] Field of Search .............................. 315/209 R, 246, 315/287, 283, 307, 308, DIG. 5, DIG. 7, 291, 194

[56] References Cited

U.S. PATENT DOCUMENTS

| | | | |
|---|---|---|---|
| 4,137,484 | 1/1979 | Osteen | 315/209 R |
| 5,057,747 | 10/1991 | Henderson | 315/158 |
| 5,306,987 | 4/1994 | Dakin et al. | 315/248 |

*Primary Examiner*—Robert Pascal
*Assistant Examiner*—David Vu
*Attorney, Agent, or Firm*—William H. McNeill

[57] ABSTRACT

Methods of operating a discharge lamp by amplitude-modulating and pulsing the lamp input power waveform. The techniques control both the arc stabilization and color characteristics of the lamp, respectively. The alternating current (AC) input waveform is amplitude-modulated to stabilize the arc with a swept AC periodic wave (such as a sine wave, sawtooth wave, square wave, etc., or a combination thereof). The swept wave can be generally swept from about 20 kHz to 60 kHz, with a preferable band sweep of from approximately 40 kHz to 50 kHz. The sweep can also be patterned (such as allowing the sweep to have stepped rises and falls within the sweep cycle). The sweep may also contain multiple-frequency sweeps that are bundled together to modulate the carrier wave. These modulation forms are used to center, constrict and stabilize the arc. In addition to this stabilization, the lamp input waveform is pulsed to control and regulate the color characteristics of the lamp.

28 Claims, 4 Drawing Sheets

COLOR CONTROL AND ARC STABILIZATION FOR HIGH-INTENSITY, DISCHARGE LAMPS

TECHNICAL FIELD

The present invention pertains to discharge lamps and, more particularly, to methods of stabilizing and controlling the characteristics of discharge lamps, by amplitude-modulating the input alternating current (AC) power wave with a periodic waveform and/or a pulse wave to control both arc stabilization and color characteristics.

BACKGROUND ART

Discharge lamps have been operated in pulsed mode, as illustrated in U.S. Pat. No. 4,904,903 (issued to Pacholok on Feb. 27, 1990, and entitled "Ballast for High Intensity Discharge Lamps"). This patent teaches methods of operating fluorescent, mercury vapor, sodium and metal halide (MH) lamps, so that the input is electronically, periodically gated for a portion of the wave period. This pulsed operation is effective in eliminating undesirable electromagnetic and radio interference emissions.

Color control of high-intensity discharge (HID) lamps by pulsing techniques is also well known in the art, as shown by U.S. Pat. Nos. 4,137,484; 4,839,565; and 4,963,796. Japanese Patent No. 432153 teaches the use of exterior temperature regulation to control the color of its discharge lamp. Other color-controlling methods include interior temperature regulating techniques and varying the salts within the discharge tube.

One of the major problems in the operation of discharge lamps is the deformation of the arc within the discharge tube by convective gas flow. Techniques for stabilizing and centering this arc have been developed. U.S. Pat. No. 5,134,345 (issued to El-Hamamsy et al on Jul. 28, 1992, and entitled "Feedback System for Stabilizing the Arc Discharge of a High Intensity Discharge Lamp"), illustrates a method of avoiding acoustic frequencies that cause destabilizing phenomena. The method of this patent teaches the detection of arc instabilities, and changing the drive frequencies that cause them.

In U.S. Pat. No. 5,306,987 (issued to Dakin et al on Apr. 26, 1994, and entitled "Acoustic Resonance Arc Stabilization Arrangement in a Discharge Lamp"), an arc stabilization technique is illustrated in which the frequency of the drive signal is modulated. A similar method of controlling the arc in discharge lamps is illustrated in U.S. Pat. No. 5,198,727 (issued to Allen et al on Mar. 30, 1993, and entitled "Acoustic Resonance Operation of Xenon-Metal Halide Lamps on Unidirectional Current"). With this method, the arc is centered by the "acoustic perturbations" induced by the frequency of the drive signals. The acoustic perturbations compel the gas or vapor movement patterns to counter the gravity-induced convection.

The present inventors have developed new methods of controlling arc destabilization in HID lamps; these techniques can additionally be added to a method that changes the color characteristics of the lamps. The new color-changing technique pulses the power input to the lamp; its arc is then stabilized by amplitude-modulating the carrier wave with a periodic waveform. In other words, the color-control pulsing is combined with an acoustic centering, constricting and stabilizing of the arc.

DISCLOSURE OF THE INVENTION

It is, therefore, an object of this invention to obviate the disadvantages of the prior art.

It is another object of the invention to enhance the operation of arc discharge lamps.

These objects are accomplished, in accordance with one aspect of the present invention, by the provision of methods of operating a discharge lamp by amplitude-modulating and pulsing the lamp input power waveform. The techniques control both the arc stabilization and color characteristics of the lamp, respectively. The alternating current (AC) input waveform is amplitude-modulated to stabilize the arc with a swept AC periodic wave (such as a sine wave, sawtooth wave, square wave, etc., or a combination thereof). The swept wave can be generally swept from about 20 kHz to 60 kHz, with a preferable band sweep of from approximately 40 kHz to 50 kHz. The sweep can also be patterned, such as allowing the sweep to have stepped rises and falls within the sweep cycle. The sweep may also contain multiple-frequency sweeps that are bundled together to modulate the carrier wave. These modulation forms are used to center, constrict and stabilize the arc. In addition to this stabilization, the lamp input waveform is pulsed to control and regulate the color characteristics of the lamp.

A typical discharge lamp that can use the inventive methodology can comprise a 100-watt metal halide (MH) lamp. Pulse operation of the lamp is different from continuous power operation. During the simmer period between pulses, the lamp runs in an equilibrated, low-power state. When the power pulse is suddenly applied, the time-dependent processes that are involved in reaching a new equilibrium condition for the high-power condition are separated by their individual time constants. An example of this is the domination of the fast-reacting processes, which cause increased light output from mercury emission. In accordance with an aspect of the invention, the power in the pulse is increased while keeping the average power constant. This causes the color temperature and color-rendering index (CRI) to increase at relatively constant intensity. When utilizing this pulsing technique, the arc in the arc tube will normally be forced against the arc tube wall. Without the aforementioned stabilization, this results in damage to the wall, a shortened lamp-life and general deterioration of the color characteristics. Thus, it is desirable to combine the two methods. Being so operated, the lamp can function in either a vertical or a horizontal operating position.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
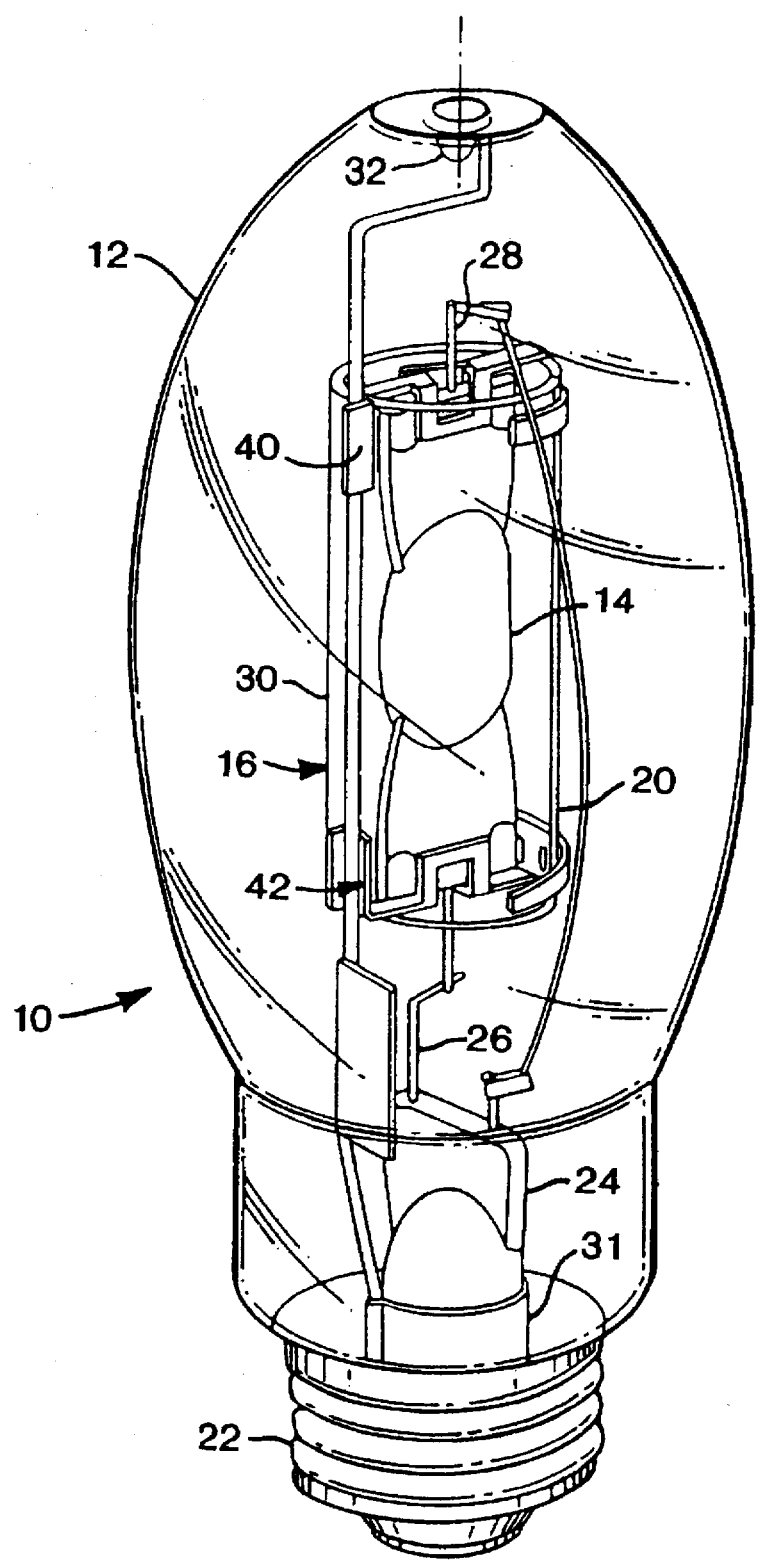
FIG. 1 illustrates a perspective view of a typical high-intensity discharge (HID) lamp that can benefit from the methods of this invention.

Referring now to the drawings with greater particularity, there is shown in FIG. 1 a typical discharge lamp 10. This high-intensity discharge lamp 10 includes an outer jacket 12 that is constructed of glass. Within the outer jacket 12 is disposed an arc tube 14. The arc tube 14 may be surrounded by a shroud 20 of any suitable material. The arc tube is filled with gases and/or substances (such as metal halides) that will form a high-intensity light discharge when electrically excited.

The arc tube 14 is held in place within the outer jacket 12 by means of a mounting support 16 that also encompasses the shroud 20. Electrical power input is fed to the arc tube 14 via base 22, a lamp stem 24 and electrical leads 26 and 28, respectively. The mounting support 16 includes a metal support rod 30 that is attached to the lamp stem 24 via strap 31. The support rod 30 also engages a protuberance 32 that projects inwardly from the top of the outer jacket 12. The central portion of the support rod 30 is substantially parallel to a vertical axis running through the arc tube 14 and the shroud 20. Respective clips 40 and 42 act to further support the rod 30, with respect to the arc tube 14 and shroud 20. The clips 40 and 42 are each welded to rod 30. A more detailed description of the materials and fabrication of the discharge lamp 10 can be found in U.S. Pat. No. 5,270,608, the pertinent teachings of which are incorporated herein by way of reference.

Figure 2:
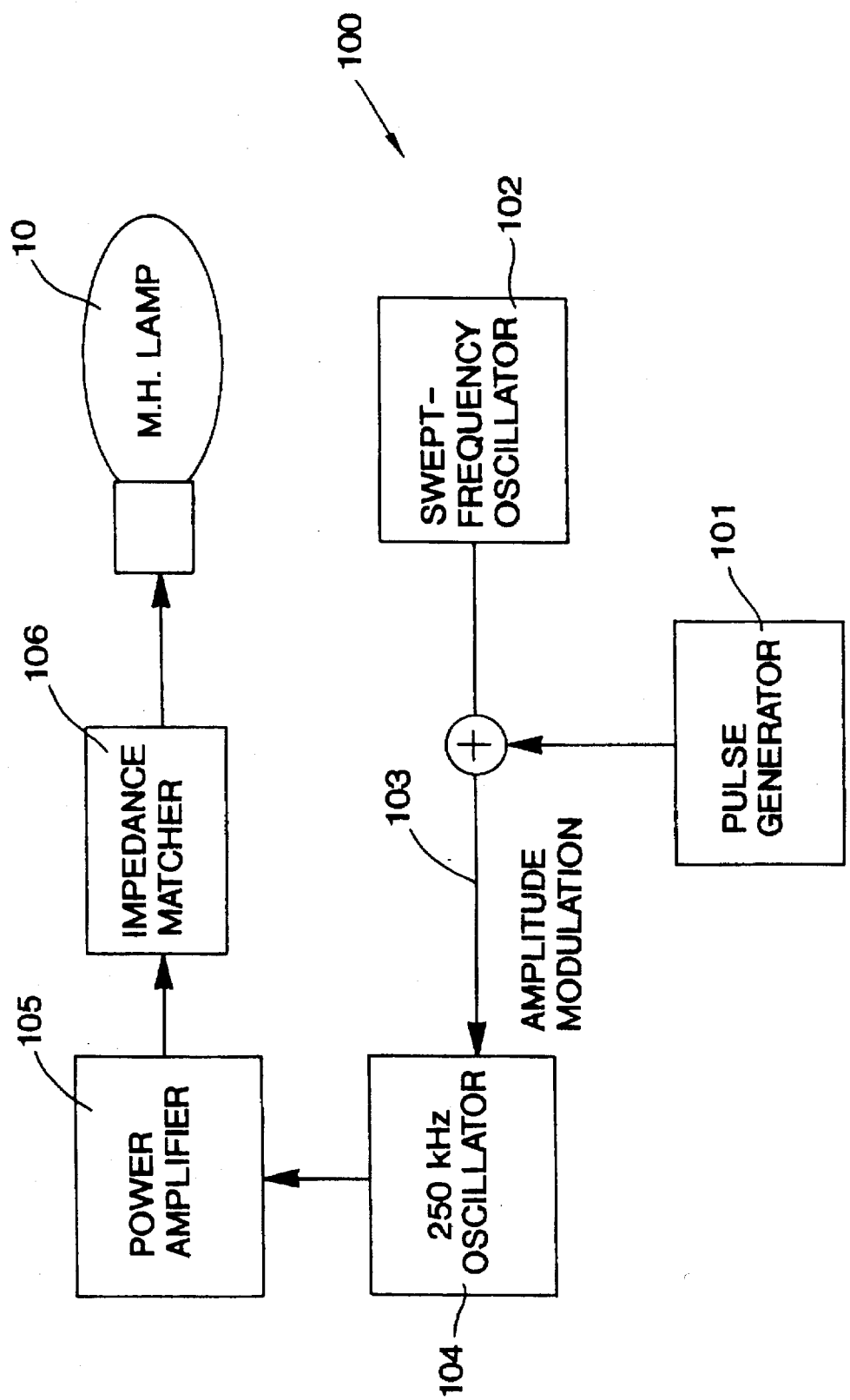
FIG. 2 depicts a block diagram for a system that performs and implements an embodiment of the invention, combining pulsed excitation with acoustic arc stabilization, for the lamp shown in FIG. 1.

Referring to FIG. 2, a system 100 is illustrated for pulse-exciting the lamp 10 of FIG. 1 to control the color characteristics, in combination with amplitude-modulating the input power to provide acoustic arc stabilization. The pulse to provide color control for lamp 10 is supplied by pulse generator 101. A typical pulse generator 101 which can be employed is a Model No. 3300, manufactured by B & K. The pulse is combined with a swept periodic wave generated by a sweeping frequency oscillator 102 to provide signal 103. A typical swept-frequency oscillator 102 can be a Model No. F34, manufactured by Interstate Electronics Corporation.

The combined signal 103 modulates the amplitude of the input power wave, provided by the 250-kHz oscillator 104. A typical oscillator 104 can comprise Model No. 3325A, manufactured by Hewlett Packard. The modulated input is then amplified by power amplifier 105. A typical power amplifier can be Model No. 1140LA, manufactured by Electronic Navigation Instruments. The amplified input signal is then impedance-matched to the lamp 10, by an impedance-matching circuit 106. The matched signal is then fed to lamp 10, as shown.

Figure 3A:
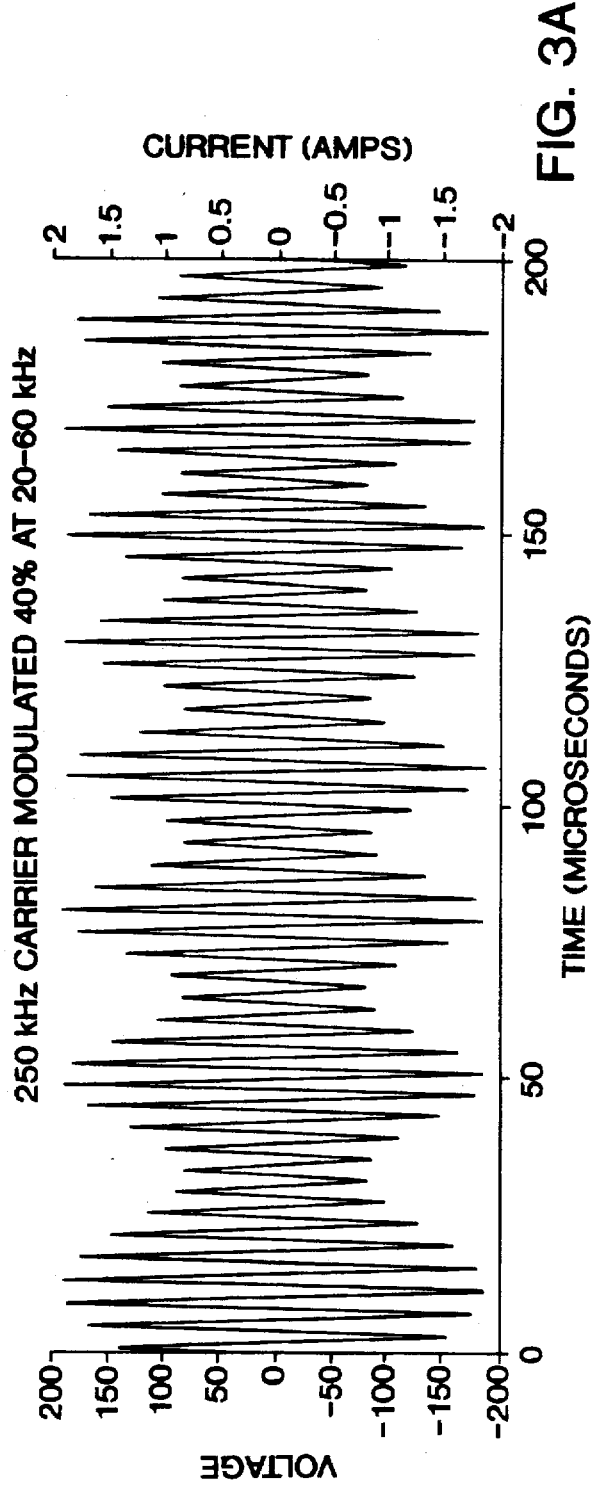
FIG. 3 illustrates a graph of a typical example of a lamp waveform in accordance with an embodiment of this invention, showing a swept-frequency, amplitude-modulated, 250 kHz carrier wave, being modulated with a sweep from 20 kHz to 60 kHz.
Figure 3B:
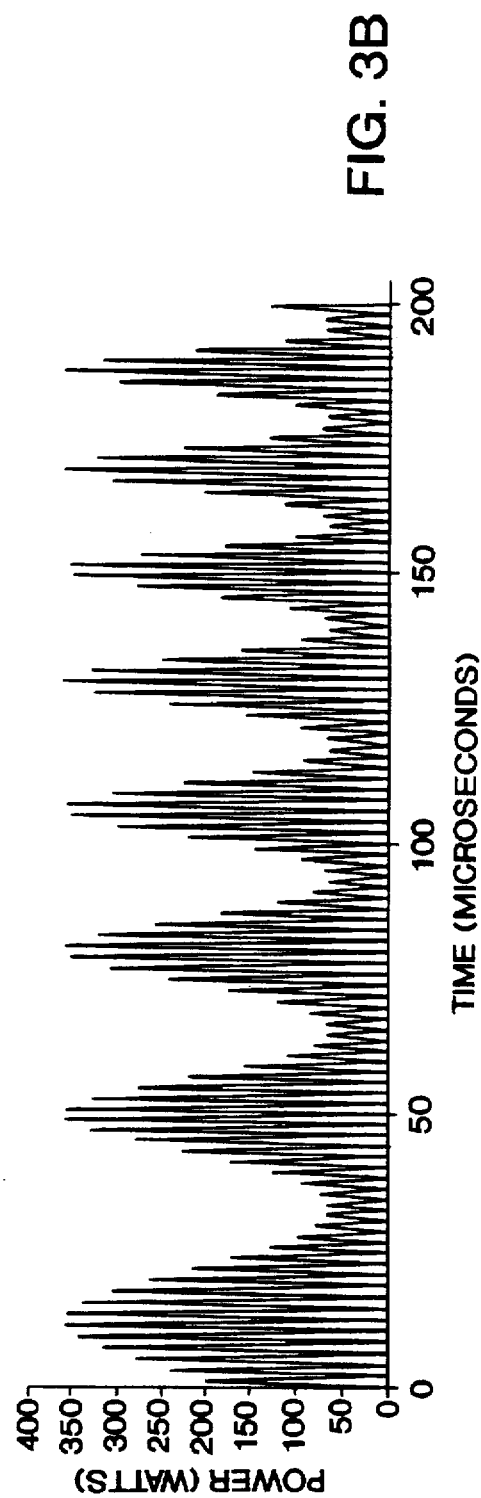

Referring to FIG. 3, a typical swept-frequency amplitude-modulated 250-kHz carrier input in accordance with the system shown in FIG. 2, is illustrated. A general sweep can be from approximately 20 kHz to 60 kHz, with a preferred sweep band being approximately between 40 kHz and 50 kHz for the lamp shown in FIG. 1. Other lamps may require different excitation, as will be obvious to those skilled in the art.

Figure 4A:
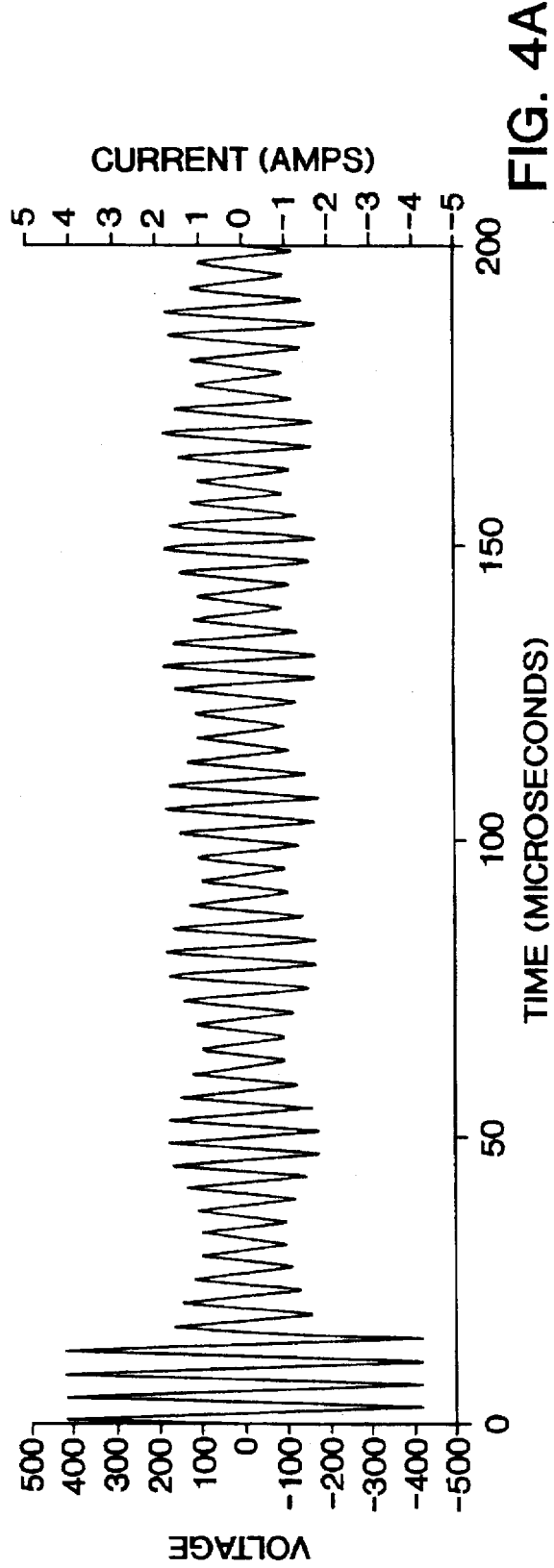
FIG. 4 depicts a graph of a sample lamp waveform, showing a 15-microsecond power pulse with swept-frequency acoustic stabilization.
Figure 4B:
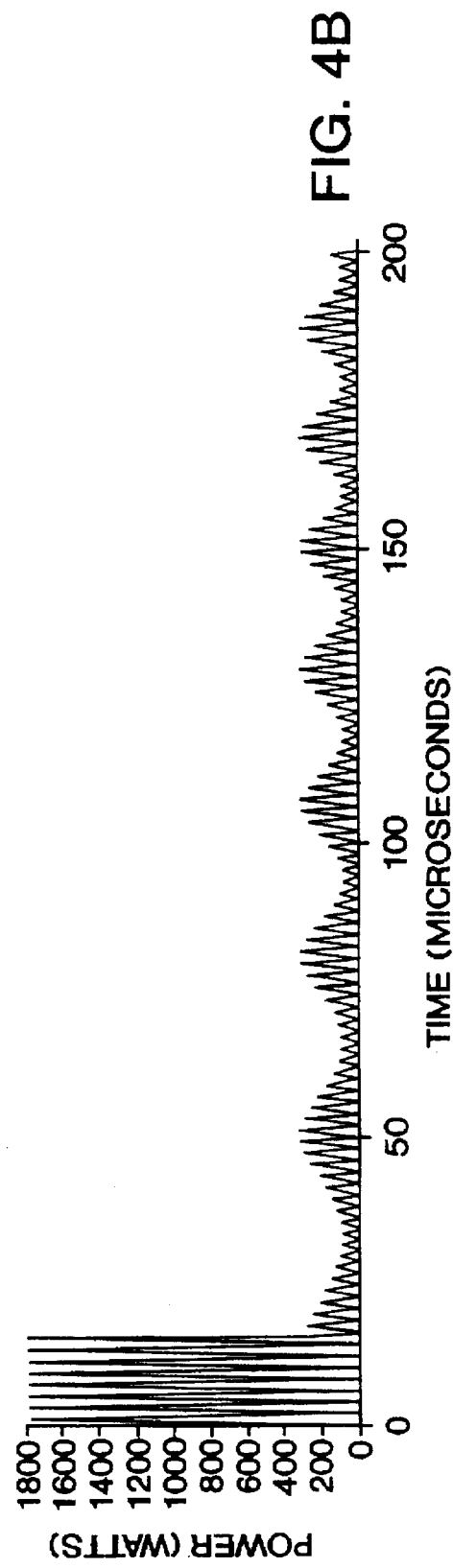

A typical power pulse with swept-frequency acoustic stabilization that is fed to lamp 10, is illustrated in FIG. 4. Power pulsing can be varied to change the color temperature and the color-rendering index (CRI) of the lamp. For example, utilizing the input shown in FIG. 4, the color temperature was increased by 400 degrees, and the CRI increased by four (4) points, on a 100-watt Metalarc™ lamp; it retained the average power at 100 watts.

As aforementioned, the sweep can also be patterned (such as allowing the sweep to rise and fall within each sweep cycle). The sweep may also contain multiple-frequency sweeps that are bundled together to modulate the carrier wave. These modulation waveforms are used to center, constrict and stabilize the arc. The AC input waveform can be amplitude-modulated to produce a power spectrum with certain characteristics. Specifically, it must contain sufficient amplitude within the frequency bands responsible for straightening and constricting the arc, while containing insignificant amplitudes within the bands capable of destabilizing the arc. For example, sine wave amplitude modulation swept in frequency from 40 kHz to 50 kHz produces a power spectrum suitable for stabilization of the discharge of a 100 W Metalarc™ lamp. However, similar results have been obtained using band-limited noise or sine wave modulation frequency-modulated by noise. All successful implementations produced a power spectrum with similar frequency coverage of the 40 kHz to 50 kHz band.

Since other modifications and changes varied to fit particular operating requirements and environments will be apparent to those skilled in the art, the invention is not to be considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A system for improving the operation of a discharge lamp, comprising: power input means for supplying a discharge lamp with an input waveform to power said discharge lamp having a light-emitting arc; pulsing means operatively connected to said power input means for pulsing said input waveform control color characteristics of said discharge lamp; and arc stabilization means operatively connected to said power input means and to said pulsing means, said arc stabilization means amplitude-modulating said input waveform by means of at least one periodic waveform, so as to constrain said arc of said discharge lamp, whereby said pulsing for controlling color characteristics of said discharge lamp is of sufficient amplitude to provide color control.

2. The system for improving the operation of a discharge lamp in accordance with claim 1, wherein said arc stabilization means provides at least one periodic waveform selected from a group of periodic waveforms consisting of sine wave, sawtooth wave, square wave and combinations thereof.

3. The system for improving the operation of a discharge lamp in accordance with claim 1, wherein said arc stabilization means provides a swept-frequency periodic waveform.

4. The system for improving the operation of a discharge lamp in accordance with claim 3, wherein said arc stabilization means provides a bundle of swept frequencies.

5. The system for improving the operation of a discharge lamp in accordance with claim 3, wherein said arc stabilization means provides a sweep of frequencies in the approximate range of between 20 kHz to 60 kHz.

6. The system for improving the operation of a discharge lamp in accordance with claim 3, wherein said arc stabilization means provides a sweep of frequencies in an approximate range of between 40 kHz to 50 kHz.

7. The system for improving the operation of a discharge lamp in accordance with claim 3, wherein said arc stabilization means provides a sweep of frequencies that is patterned.

8. The system for improving the operation of a discharge lamp in accordance with claim 1, further comprising a power amplifier operatively connected to said pulsing means, to said arc stabilization means and to said power input means for amplifying said input waveform.

9. The system for improving the operation of a discharge lamp in accordance with claim 1, further comprising impedance-matching means operatively connected to said pulsing means, to said arc stabilization means and to said power input means for impedance-matching said input waveform to said discharge lamp.

10. A system for improving the operation of a discharge lamp, comprising: power input means for supplying an input waveform to power a discharge lamp having a light-emitting arc; pulsing means operatively connected to said power input means for pulsing said input waveform to control color characteristics of said discharge lamp; and arc stabilization means operatively connected to said power input means and to said pulsing means, said arc stabilization means comprising a swept-frequency oscillator for amplitude-modulating said input waveform by means of at least one swept-frequency, periodic waveform, so as to constrain said arc of said discharge lamp, whereby said pulsing for controlling color characteristics of said discharge lamp is of sufficient amplitude to provide color control.

11. The system for improving the operation of a discharge lamp in accordance with claim 10, wherein said arc stabilization means provides at least one periodic waveform selected from a group of periodic waveforms consisting of sine wave, sawtooth wave, square wave and combinations thereof.

12. The system for improving the operation of a discharge lamp in accordance with claim 10, wherein said arc stabilization means provides a bundle of swept frequencies.

13. The system for improving the operation of a discharge lamp in accordance with claim 10, wherein said arc stabilization means provides a sweep of frequencies in an approximate range of between 20 kHz to 60 kHz.

14. The system for improving the operation of a discharge lamp in accordance with claim 10, wherein said arc stabilization means provides a sweep of frequencies in the approximate range of between 40 kHz to 50 kHz.

15. The system for improving the operation of a discharge lamp in accordance with claim 10, wherein said arc stabilization means provides a sweep of frequencies that is patterned.

16. The system for improving the operation of a discharge lamp in accordance with claim 10, further comprising a power amplifier operatively connected to said pulsing means, to said arc stabilization means and to said power input means for amplifying said input waveform.

17. The system for improving the operation of a discharge lamp in accordance with claim 10, further comprising impedance-matching means operatively connected to said pulsing means, to said arc stabilization means and to said power input means for impedance-matching said input waveform to said discharge lamp.

18. A method of controlling a discharge lamp, comprising:
   a) supplying a discharge lamp with an input waveform to power said discharge lamp;
   b) pulsing said input waveform to control color characteristics of said discharge lamp; and
   c) arc-stabilizing said discharge lamp by amplitude-modulating said input waveform.

19. The method of controlling a discharge lamp in accordance with claim 18, wherein said arc-stabilizing operation (c) amplitude-modulates said input waveform with at least one periodic waveform.

20. The method of controlling a discharge lamp in accordance with claim 19, wherein said periodic waveform is selected from a group of periodic waves consisting of sine wave, sawtooth wave, square wave and combinations thereof.

21. The method of controlling a discharge lamp in accordance with claim 18, wherein said arc-stabilizing operation (c) amplitude-modulates said input waveform with a swept-frequency, periodic waveform.

22. The method of controlling a discharge lamp in accordance with claim 21, wherein said swept-frequency, periodic waveform is selected from a group of periodic waves consisting of sine wave, sawtooth wave, square wave and combinations thereof.

23. The method of controlling a discharge lamp in accordance with claim 21, wherein said swept frequency is in the approximate range of between 20 kHz to 60 kHz.

24. The method of controlling a discharge lamp in accordance with claim 21, wherein said swept frequency is in the approximate range of between 40 kHz to 50 kHz.

25. The method of controlling a discharge lamp in accordance with claim 21, wherein said swept frequency is patterned.

26. The method of controlling a discharge lamp in accordance with claim 18, wherein said arc-stabilizing operation (c) includes amplitude-modulating said input waveform with a bundle of swept frequencies.

27. The method of controlling a discharge lamp in accordance with claim 18, further comprising:
   d) amplifying said amplitude-modulated and pulsed-input waveform.

28. The method of controlling a discharge lamp in accordance with claim 18, further comprising:
   d) impedance-matching said amplitude-modulated and pulsed-input waveform with said discharge lamp.

* * * * *